United States Patent [19]
Mochizuki et al.

[11] 3,715,945
[45] Feb. 13, 1973

[54] AUTOMATIC CUTTING MACHINE

[75] Inventors: Takashi Mochizuki; Yoshinori Komasuzaki; Satoshi Hara; Hideo Nojima; Tamio Shimizu; Shigeo Suzuki, all of Tokyo, Japan

[73] Assignee: Muto Industrial Co., Ltd., Tokyo, Japan

[22] Filed: Sept. 17, 1970

[21] Appl. No.: 73,016

[30] Foreign Application Priority Data

| | | |
|---|---|---|
| Sept. 22, 1969 | Japan | 44/90672 |
| Oct. 31, 1969 | Japan | 44/103457 |
| Nov. 23, 1969 | Japan | 44/110919 |
| Jan. 16, 1970 | Japan | 45/4979 |
| Jan. 24, 1970 | Japan | 45/7702 |
| March 19, 1970 | Japan | 45/26353 |
| March 19, 1970 | Japan | 45/26354 |
| March 25, 1970 | Japan | 45/28039 |
| April 14, 1970 | Japan | 45/35921 |
| April 14, 1970 | Japan | 45/35920 |
| Dec. 16, 1969 | Japan | 44/101139 |
| Jan. 24, 1970 | Japan | 45/6447 |
| Jan. 26, 1970 | Japan | 45/6880 |
| Feb. 12, 1970 | Japan | 45/12186 |
| Feb. 12, 1970 | Japan | 45/12187 |
| March 25, 1970 | Japan | 45/24642 |
| April 15, 1970 | Japan | 45/31597 |
| April 28, 1970 | Japan | 45/36521 |
| April 28, 1970 | Japan | 45/36522 |
| June 27, 1970 | Japan | 45/56169 |

[52] U.S. Cl.............83/71, 83/374, 83/528, 83/561, 83/658, 83/925 CC

[51] Int. Cl..............B26d 1/04, B23d 27/00
[58] Field of Search..........83/71, 374, 451, 528, 615, 83/658, 561, 562, 563, 925 CC

[56] References Cited

UNITED STATES PATENTS

| | | | |
|---|---|---|---|
| 3,495,492 | 2/1970 | Gerber et al. | 83/925 CC |
| 3,477,322 | 11/1969 | Gerber et al. | 83/925 CC |
| 2,204,258 | 6/1940 | Ryan | 83/528 |
| 3,548,697 | 12/1970 | Gerber et al. | 83/658 X |
| 245,150 | 8/1881 | Fowler | 83/658 UX |
| 3,575,076 | 4/1971 | Baldwin et al. | 83/925 CC |
| 3,511,124 | 5/1970 | Burns | 83/925 CC |
| 1,172,058 | 2/1916 | Scheyer | 83/71 |

*Primary Examiner*—James M. Meister
*Attorney*—Wenderoth, Lind and Ponack

[57] ABSTRACT

An automatic cutting machine comprising a cutting table made of a spray material or brush-like fine hair, and a carriage mounting a cutting device comprising a cutter and adapted to move parallel to the upper surface of the cutting table. The carriage is operatively associated with a numerical control system and moves in a predetermined directions while the cutter moves up and down in reciprocating motion to cut into the cutting table, so that a cloth or other material placed on the cutting table can be automatically cut into any shape as desired while the cloth is held in place by a suction force produced in a section of the cutting table where cutting of the material is effected.

4 Claims, 21 Drawing Figures

TAKASHI MOCHIZUKI,
YOSHINORI KOMATSUZAKI
SATOSHI HARA,
HIDEO NOJIMA,
TAMIO SHIMIZU and
SHIGEO SUZUKI,

INVENTORS

BY Wenderoth, Lind & Ponack

ATTORNEYS

TAKASHI MOCHIZUKI,
YOSHINORI KOMATSUZAKI,
SATOSHI HARA,
HIDEO NOJIMA,
TAMIO SHIMIZU and    INVENTORS
SHIGEO SUZUKI,

ATTORNEYS

TAKASHI MOCHIZUKI,
YOSHINORI KOMATSUZAKI,
SATOSHI HARA,
HIDEO NOJIMA,
TAMIO SHIMIZU and
SHIGEO SUZUKI,

INVENTORS

ATTORNEYS

TAKASHI MOCHIZUKI,
YOSHINORI KOMATSUZAKI,
SATOSHI HARA,
HIDEO NOJIMA,
TAMIO SHIMIZU and
shigeo SUZUKI,

INVENTORS

BY Wendworth Lind & Ponack
ATTORNEYS

AUTOMATIC CUTTING MACHINE

BACKGROUND OF THE INVENTION

It is customary when work clothes and the like of the same size are made in large numbers that a number of cloths are placed one over another in superposed relation and cut simultaneously in accordance with a predetermined pattern.

In the cutting process of this type, it has been customary to mount a cutter on a support post of a cutting machine and a cloth or other material is placed on a cutting table formed with an opening large enough to permit the cutter to extend therethrough and disposed below the cutter. When cutting is effected by this arrangement, the cutter is driven by an electric motor which moves up and down in vibratory motion as the rotary motion of the motor is converted into the reciprocating motion while the cloth or other material is moved manually toward the cutter so as to cut the cloth or other material in accordance with a predetermined pattern. Thus, the present practice in cutting a number of cloths, for example, at one time requires the simultaneous moving of a number of cloths to cut the same in accordance with the pattern. It is required to exercise utmost care so as to prevent the misalignment of the cloths during movement. Since the cloths have a substantial weight and a considerable width, they are hard to handle manually. Thus, it is a laborious and time-consuming operation for the operator to cut the cloths by a conventional cutting machine. The cutting operation performed in this way is fatiguing both mentally and physically.

SUMMARY OF THE INVENTION

This invention relates to an automatic cutting machine wherein a cutter moves horizontally parallel to the upper surface of a cutting table while moving up and down in vibratory motion in such a manner that the forward end of the cutter extends through the upper surface of the cutting table so as to cut a cloth held in place on the upper surface of the cutting table into a predetermined shape.

A general object of this invention is to provide an automatic cutting machine comprising a cutting table made of a spongy material or brush-like fine hair and adapted to place a cloth on its upper surface, and a carriage mounting a cutter and operatively associated with a numerical control system for movement horizontally parallel to the upper surface of the cutting table, such cutter moving in predetermined directions as such carriage moves horizontally so as to thereby cut the cloth on the cutting table to a predetermined shape by the cutting action of the cutter.

Another object of the invention is to provide means for automatically cutting a cloth to a predetermined shape by mounting a cutter on a carriage disposed above the cutting table and automatically movable horizontally parallel to the upper surface of the cutting table and by moving the cutter up and down in vibratory motion in a vertical direction with respect to the upper surface of the cutting table, so that the cutter extends through the upper surface of the cutting table and the cloth placed thereon as the cutter moves up and down and the carriage moves horizontally, whereby the cutter can be moved in predetermined directions.

Another object of the invention is to provide a balance maintaining device in a mechanism for operating the cutter up and down in reciprocating motion in an automatic cutting machine of the type described, so that the cutter can operate smoothly without shaking laterally.

Another object of the invention is to provide means for controlling the direction of movement of a cutter by mounting the cutter for free swinging motion on a carriage adapted to be moved parallel to the upper surface of a cutting table by a numerical control system, so that the cutter can be angularly rotated as it moves along predetermined paths in order that the blade of the cutter may face the direction of movement of the cutter at all times.

Another object of the invention is to provide a lifting mechanism for lifting a cutter mounted for up and down vibratory motion on a carriage movable horizontally parallel to the upper surface of a cutting table, so that when the cutter is moved upwardly by the lifting mechanism the forward end of the cutter is moved away from the upper surface of the cutting table a predetermined distance. Such cutter lifting mechanism is indispensable to an automatic cutting machine of the type described, because it is impossible, if the forward end of the cutter remains piercing through the upper surface of the cutting table at all times, to readily move the carriage in the X-Y directions of the cutting table by manual operation at all times.

Still another object of the invention is to provide means for holding downwardly the portion of a cloth at which the cutter is disposed for effecting cutting, such hold-down means being provided in close proximity to the cutter for preventing the shaking of the cloth when cutting is effected by moving the cutter.

Still another object of the invention is to provide means for positively holding a cloth in place on a cutting table by the action of a suction force produced on the upper surface of a cutting table formed of a spongy material or brush-like fine hair housed in a box by a vacuum device connected through a tube to the interior of such box.

A further object of the invention is to provide means for producing a suction force only on the upper surface of a section of a cutting table on which a cutter is disposed for effecting cutting of the portion of a cloth disposed on such section of the cutting table without producing a suction force on the upper surfaces of the sections of the cutting table remote from the section in which cutting of the cloth is effected, so that a vacuum device of smaller capacity than would other wise be required can be used to produce a suction force of sufficiently high power for holding The cloth in place on the cutting table. To this end, a box for housing therein a spongy material or brushlike fine hair making up a cutting table is divided into a plurality of chambers and a chamber or chambers of such box at which the cutter is disposed for effecting cutting are maintained in communication with the vacuum device.

Additional objects as well as features and advantages of this invention will become evident from the description set forth hereinafter when considered in conjunction with the accompanying drawings which show preferred embodiments of this invention and such embodiments will be described. However, it is to be understood that various changes may be made from the constructions disclosed, and that the drawings and description are not to be construed as defining or in any way limiting the scope of the invention, the claims forming a part of this specification being relied upon for that purpose.

DESCRIPTION OF THE PREFERRED EMBODIMENTS

Preferred embodiments of this invention will now be explained with reference to the accompanying drawings.

Figure 1:
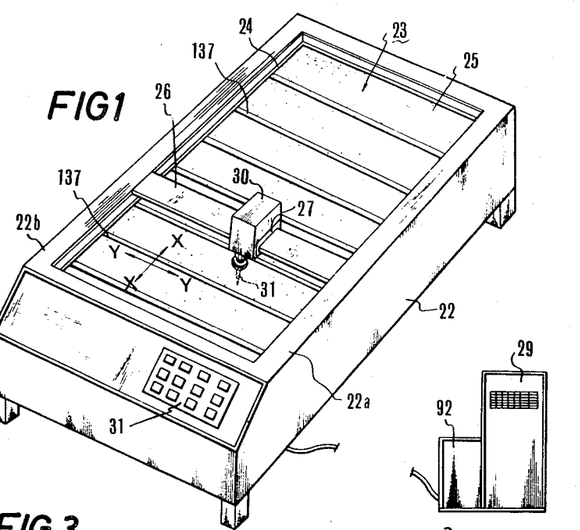
FIG. 1 is a perspective view of an automatic cutting machine according to this inventions.

FIG. 1 shows an automatic cutting machine according to this invention in its entirety. The automatic cutting machine comprises a main body 22 having a cutting table 23 disposed in its central portion. The cutting table 23 is made of a spongy material 25 removably contained in a box 24. Disposed between opposite sides 22a and 22b of the main body 22 and arranged parallel to the upper surface of the cutting table 23 is a movable bar 26 which has opposite ends secured to endless belts rotatably mounted on the opposite sides 22a and 22b of the main body. The endless belts are adapted to move along the opposite sides 22a and 22b of the main body 22 as a pulse motor or servo motor MX rotates so as to cause the movable bar 26 to move along the opposite sides 22a and 22b of the main body 22.

27 refers to a carriage slidably mounted on the movable bar 26 which is adapted to move along the movable bar 26 as the output shaft of a pulse motor or servo motor MY provided in the main body 22 rotates. The output shaft of the motor MY for operating the carriage 27 is connected to the carriage 27 by a wire (not shown). The rotation of the pulse motor or servo motor MX for operating the endless belts for driving the movable bar 26 and the rotation of the pulse motor or servo motor MY for moving the wire for operating the carriage 27 are controlled by pulse signals and other drive signals supplied from a computor 29. The motors MX and MY drive the carriage in the X-Y directions on the cutting table 23. A numerical control mechanism for moving the carriage 27 in the X-Y directions is similar to a pen or light beam moving mechanism used in an automatic drawing machine and X-Y plotter. It is to be understood that various types of X-Y coordinate machines may be used in place of the illustrated mechanism.

30 refers to a cutting device mounting on the carriage 27 which comprises a cutter 31 disposed substantially perpendicularly with respect to the upper surface of the cutting table 23 and adapted to be operated by a cutter up-and-down moving mechanism provided in the cutting device 30 while the forward end of the cutter 31 extends through the upper surface of the cutting table 23. The cutting device 30 further comprises a cutter lifting mechanism which moves the cutter 31 upwardly from a position in which the forward end of the cutter extends through the upper surface of the cutting table 23. Before a cutting operation is performed, the cutter 31 is maintained by the cutter lifting mechanism in a position in which the forward end of the cutter 31 is spaced apart from the upper surface of the cutting table 23. The cutting device 30 further comprises a cutter blade angle varying mechanism which operates such that the cutter 30 can be angularly rotated so that the blade of the cutter may face the direction of movement of the cutter 31 at all times.

The starting and stopping of the cutter up-and-down moving mechanism, the actuation of the cutter lifting mechanism and the operation of the cutter blade angle varying mechanism are automatically controlled by the computor 29. The aforementioned mechanisms may be manually operated by depressing a group of pushbuttons 31.

The operation of the automatic cutting machine described above will be explained. A cloth or other material to be cut is placed on the upper surface of the cutting table 23. On the other hand, the shape into which the cloth is to be cut is recorded as an input on a paper tape or other medium which is read by a read-out device of the computor 29 and converted into pulse signals which are applied to the pulse motor MX for operating the endless belts and the pulse motor MY for operating the carriage 27 so as to rotate the respective motors.

As the motors MX and MY rotate, the movable bar 26 moves in the direction of the arrow X and the carriage 27 moves in the direction of the arrow Y. On the other hand, the cutter up-and-down moving mechanism is actuated by a command from the computor 29 so as to move the cutter 31 up and down in vibratory motion. The cutter lifting mechanism is also actuated by a command from the computor 29 so as to move the cutter 31 downwardly a predetermined distance to cause the forward end thereof to extend through the upper surface of the cutting table 23. Thus, the cutter 31 moves up and down in vibratory motion while the upper end of the cutter 31 remains extending through the upper surface of the cutting table 23, whereby the cloth on the cutting table 23 can be cut.

As the cutter 31 is moved by the carriage 27 in X-Y directions, the cutter blade angle varying mechanism in the carriage 27 is actuated so that the cutter can be angularly rotated to make the blade of the cutter face the direction of movement of the cutter 31 at all times. In this way, the cloth on the cutting table 23 is automatically cut in accordance with a predetermined pattern as the cutter 31 moves in the X-y directions as instructed by the computor 29.

Figure 2:
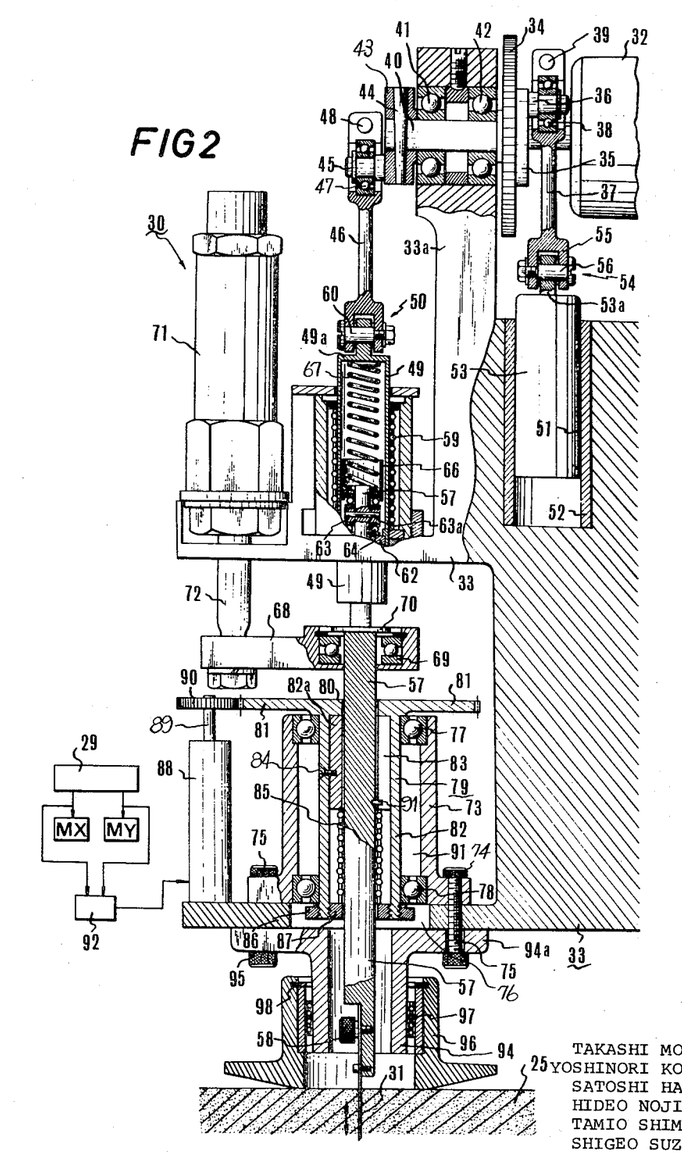
FIG. 2 is a sectional view of the internal structure of a cutting device mounted on the carriage shown in FIG. 1 and comprising a cutter up-and-down moving mechanism, a cutter lifting mechanism, and a cutter blade angle varying mechanism.

FIG. 2 shows the inner structure of the cutting device 30 mounted on the carriage 27. The mechanism for moving the cutter 31 up and down in vibratory motion of the cutting device 30 will first be described. 32 is a motor secured to a support member 33 and adapted to operate, through a pinion gear (not shown), a speed reducing gear 34 mounted on a bearing block 33a. The support member 33 is secured or pivotally connected to the carriage 27 and acts as a unit therewith. 35 refers to a disc secured to the gear 34 and supporting a crank shaft 36 in an eccentric position. A crank arm 37 is rotatably supported at one end thereof by a bearing 38 and inserted in the crank shaft 36. The end portion of the crank arm 37 on the side of the bearing 38 is forked and fitted in the bearing 38, so that the end portion of the arm 37 is received in a clamp opening 39 and secured therein by a bolt and nut (not shown), whereby the crank arm 37 can be clamped to the bearing 38. 40 refers to a transmission shaft integral with the gear 34 which is rotatably supported by the gearing block 33a through bearings 41 and 42 so as to cause a disc 43 to be secured to one end of the transmission shaft 40 by means of a tapered key 44. 45 refers to a crank shaft which is secured to the disc 45 in an eccentric position. 46 refers to a crank arm which is rotatably inserted in the crank shaft 45 through a bearing 47. The end portion of the crank arm 46 on the side of the bearing 47 is forked and fitted in the bearing 47, so that the end portion of the crank arm 46 is received in a clamp opening 48 and secured therein by a bolt and nut (not shown), whereby the crank arm 46 can be clamped to the bearing 47. A first vertical operation shaft 49 is pivotally connected at 50 to the other end of the crank arm 46. 51 refers to a guide duct formed in the support member 33 which opening is surrounded by a metal 52. Besides the metal 52, a slide ball bearing or stroke bearing may preferably be mounted in the opening 51.

53 is a balance weight which has a weight corresponding a moment similar to the moment produced in the crank arm 46 disposed in a position opposite to that of the balance weight 53 which is inserted in the guide duct 51 for up-and-down motion therein. The balance weight 53 is connected to the transmission shaft 40 so that an opposite moment of the same value as the eccentric moment produced periodically as an impact for each revolution of the transmission shaft 40 may be produced.

54 is a connecting portion secured to one end of the crank arm 37 and including a recess 55 which loosely receives therein a projection 53a formed at one end of the balance weight 53 so as to connect the crank arm 37 to the balance weight 53 by a connecting bolt 56.

The cutter 31 is removably attached to the lower end of a second vertical operation shaft 57 by a screw 58.

In the construction described above, the operation of the motor 32 rotates the gear 34 meshed with the pinion gear of the motor 32 and rotates the transmission shaft 40. This rotates the disc 35 secured to the gear 34 too, so that the crank shaft 36 moves in a circular locus while rotating and causes the crank shaft 37 inserted in the crank shaft 36 to move up and down. Since the crank arm 37 is connected at one end thereof to the balance weight 53 through the connecting portion 54, the balance weight moves smoothly up and down in the guide duct 51. The rotation of the transmission shaft 40 further rotates the disc 43, so that the crank shaft 45 secured to the disc 43 behaves in the same manner as the crank shaft 36. This causes the crank bar 46 to move up and down, so that the cutter 31 connected to the crank arm 46 moves up and down in vibratory motion too. At this time, since the moment produced in the balance weight 53 is of the same order as the moment produced in the crank shaft 45, the moment applied to the transmission shaft 40 through the crank shaft 45 is of the same order as the moment applied to the transmission shaft 40 through the crank shaft 36, so that the transmission shaft 40 rotates very smoothly.

The mechanism for lifting the cutter 31 will now be described. The first vertical operation shaft 49 is a hollow cylindrical member having a bottom at one end and elevationally mounted in the support member 33 through a slide bearing 59. The shaft 49 is pivotally connected, at one end thereof which has a bottom, at 50 to the other end of the crank bar 46 through a pin 60. 57 refers to a second vertical operation shaft which is inserted in and supported by the first vertical operation shaft 49 for rotational and axial movements therein through a supporter 63 and a bearing 64 which are connected to the second vertical operation shaft 57 through a pin 63a to act as a unit therewith. 66 is a receiver which is rotatably supported by the forward end of the portion of the second vertical operation shaft 57 which is inserted in the first vertical operation shaft 49. A coil spring 67 is mounted between the receiver 66 and bottomed end 49a of the first vertical operation shaft 49. The underside of the bearing 64 is forced to press against a stopper 62 secured to the inner wall surface of the first vertical operation shaft 49 by the biasing force of the spring 67.

68 refers to a connecting rod provided with a bearing 69 at one portion thereof. The other end of the second vertical operation shaft 57 extends through the bearing 69. Formed at one portion of the second vertical operation shaft 57 is a flange 70 which is adapted to engage the connecting rod 68. 71 refers to an operation mechanism secured to the supporting member 33 which may comprise a pneumatic cylinder or a magnet device, for example. The mechanism 71 comprises a movable part 72 which is adapted to move as a control command is given to the mechanism 71. The movable part 72 is connected at one end thereof to a connecting rod 68. The up-and-down movement of the first vertical operation shaft 49 is transmitted to the second vertical operation shaft 57 through the coil spring 67, receiver 66, bearing 64 and supporter 63.

When it is desired to move the forward end of the cutter 31 so as to cut the cloth in a position which is different from the position in which continuous cutting has been effected so far, a control command is given to the operation mechanism 71 so as to withdraw the movable part 72 into the mechanism 71. The movement of the movable part 72 results in the connecting rod 68 moving upwardly into engagement with the flange 70. While in this position, the connecting rod 68 pushes the flange 70 upwardly from below. This causes the first and second vertical operation shafts 49 and 57 to move upwardly while the crank shaft 45 is caused to make one-half revolution upwardly. The second vertical operation shaft 57 is further moved upwardly against the biasing force of the coil spring 67 till it reaches and stops at its uppermost position which is determined by the uppermost position of the movable part 72.

At this time, the cutter 31 moves upwardly a greater distance than the distance covered by the up-and-down movement in a normal cutting operation so that the forward end of the cutter 31 is moved upwardly away from the upper surface of the cutting table. Thus, the subsequent movement of the carriage 27 does not cause the cutter 31 to catch the cloth. If a control command given to the operation mechanism 71 is removed after completion of the movement of the carriage 27, the second vertical operation shaft 57 is moved downwardly by the biasing force of the spring 67 into a normal position where the cutter 31 waits for the next cutting operation command.

When the first and second vertical operation shafts 49 and 57 are restored to their normal positions by the cutter lifting mechanism, the cutter 31 is preferably moved downwardly to a position in which the forward end of the cutter 31 extends through the upper surface of the cutting table 23 into the interior of the table. The cutter 31 is set such that, when the motor 32 is operated to move, the cutter 31 up and down in vibratory motion, the cutter 31 moves up and down while the forward end thereof remains extending through and does not move upwardly away from the upper surface of the cutting table, with the uppermost point of the up-and-down vibratory movement of the cutter 31 being disposed below or in the same plane as the upper surface of the cutting table. In this way, the cutter 31 moves up and down in vibratory motion while the forward end of the cutter 31 remains extending through the cloth and the upper surface of the cutting table 23 as cutting is effected by moving the cutter 31 in the X-Y directions, so that the cloth can be cut continuously without leaving any thread of the cloth left uncut.

The cutter blade angle varying mechanism will be explained hereinafter. 73 refers to a sleeve threadably secured by screws 74 and 75 to the support member 33. The sleeve 73 has an axial central bore communicating with an opening 76 formed in the support member 33 and mounting bearings 77 and 78 therein. 79 refers to a drive member comprising a gear portion 81 formed with an opening 80 in the center and a hollow postion 82 which is rotatably supported by the bearings 77 and 78 mounted on the sleeve 73. 82a refers to a cylindrical guide formed with a longitudinally extending slit 83 of a certain width and fitted in the hollow portion 82. The guide 82a is connected to the drive member 79 through a bolt 84 so as to act as a unit therewith. 85 refers to a slide ball bearing mounted at the lower portion of the guide 82a for supporting the second vertical operation shaft 57 to ensure that the shaft 57 moves smoothly up and down. 86 and 87 are stop rings for the bearings 87 and 88 respectively for preventing the dislodging of the bearings. 88 refers to a servo motor or pulse motor having a drive shaft 89 to which a gear 90 is secured. The gear 90 which is maintained in meshing engagement with the gear portion 81 of the drive member 79 so as to transmit the rotation of the motor 88 to the drive member 79. A pin 91 attached to the second vertical operation shaft 57 is received in the slit 83. Thus, the pin 91 moves freely in the slit 83 and does not engage the guide 82a when the second vertical operation shaft 57 moves up and down. However, when the guide 82a rotates, the rotation is transmitted through the pin 91 to the second vertical operation shaft 57 which rotates too.

When automatic cutting is effected, inputs to the motor MX for operating the movable bar 26 and the motor MY for operating the carriage in the X-Y coordinate machine are supplied from an associated input device, such as a computor or similar device. The input signals applied to the motors MX and MY are vectorially mixed by a member 92 into a mixed output signal associated with the directions of movements of the cutter 31 in the directions of X axis and Y axis which signal is then converted into a suitable signal for operating the servo motor or pulse motor 88.

The servo motor or pulse motor 88 is rotated in a normal or reverse direction by the aforementioned signal and the rotational output of the motor 88 is transmitted to the guide 82a through the gear 90 and the drive member 79 maintained in meshing engagement with the gear 90. Since the pin 91 attached to the second vertical operation shaft 57 is received in the slit 83 of the guide 82a, the rotation of the guide 82a is transmitted through the pin 91 to the second vertical operation shaft 57 which rotates through a certain angle with the aid of the bearings 69 and 64, so as to angularly rotate the cutter 31 and cause the blade of the cutter to face the direction of movement of the cutter. Thus, the cutter 31 which is directional can angularly change the direction in which its blade faces as the cutter 31 changes its direction of movement, making it possible to accurately cut the cloth along a curve in an automatic cutting operation. In place of using the member 92 for controlling the servo motor or pulse motor 88, means may be provided, for example, in the computor 29 for vectorially mixing the signals for operating the motors MX and MY to provide a mixed signal which is converted into a signal suitable to operating the servo motor or pulse motor 88.

The mechanism for holding down the cloth will be explained. 94 refers to a holding-down cylinder formed with a flange 94a which is secured to the support member 33 by screws 95. 96 designates a cloth holding-down member having a built-in slide ball bearing 97 which is fitted over the holding-down cylinder 94 through the agency of the slide ball bearing 97 for free up-and-down motion. 98 is a stop ring for preventing the slide ball bearing 97 from being dislodged which ring is formed by cutting out a portion of a metal formed in the shape of a true circle.

When cutting is effected, the cloth is held downwardly by the cloth holding down member 96, so that the cloth on the cutting table 23 is prevented from moving upwardly and shaking back and forth or to right and left or moving unnecessarily in any direction, making it possible to cut the cloth accurately. Also, the random cutting of the cloth caused by the shaking or movement of the cloth can also be prevented. The provision of the cloth holding down member 96 mounted over the keep-down cylinder 94 through the slide ball bearing 97 for free up-and-down motion is effective to accommodate irregularities which might be present on the upper surface of the cloth and might other wise interfere with the smooth movement of the carriage 27 while cutting is effected. It is to be noted that similar results could be achieved if the cloth keeping down member 96 is fixedly secured to the keep-down cylinder 94 without using the slide ball bearing 97.

Figure 3:
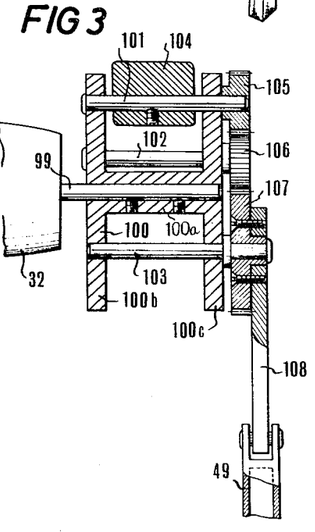
FIG. 3 is a sectional view, with certain parts being shown in section of a second embodiment of the cutter up-and-down moving mechanism of the cutting device.
Figure 4:
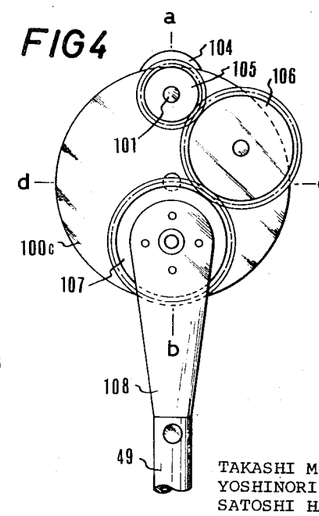
FIG. 4 is a side view of FIG. 3.

FIGS. 3 and 4 show a second embodiment of the cutter up-and-down moving mechanism of the cutting device 30. 32 refers to a motor secured to a support member (not shown). 99 refers to a drive shaft of the motor 32. A rotary member 100 comprising discs 100b and 100c integrally attached to opposite sides of a cylindrical shaft 100a secured to the drive shaft 99. 101, 102 and 103 refer to support shafts rotatably mounted between the discs 100b and 100c, with the support shafts 101 and 103 being mounted in positions diametrically opposed to each other on the discs and the support shaft 102 being mounted in a position displaced laterally from the line connecting the positions in which the support shafts 101 and 103 are disposed. However, the support shaft 102 may be mounted on the same diametrical line as the support shafts 101 and 103. The support shaft 101 mounts an eccentric with 104 thereon, and the support shafts 101, 102 and 103 mount, at the ends thereof which extend outwardly through the disc 100c, a driven gear 105, idling gear 106 and drive gear 107 respectively, which are maintained in meshing engagement with one another. The ratio of the teeth of the gear 107 to the teeth of the gear 105 is 2:1. 108 refers to a crank arm secured to the drive gear 107 and having one end inserted in the support shaft 103. The first vertical operation shaft 49 is connected to the lower end of the crank arm 108 to which are attached the second vertical operation shaft and cutter.

The idling gear 106 may be done without, with the driven gear 105 being directly connected to the drive gear 107. The rotary member 100 and eccentric weight 104 may be of any other form than those illustrated.

The rotation of the drive shaft 99 in a clockwise direction drives the discs 100b and 100c in a clockwise direction. The drive shaft 107 moves in a clockwise direction together with the disc 100c and begins to rotate in an anticlockwise direction relative to the disc 100c. The anticlockwise rotation of the drive gear 107 causes the idling gear 106 to rotate in a clockwise direction relative to the disc 100c, with the driven gear rotating in an anticlockwise direction. Accordingly, the crank arm 108 begins to move in a clockwise direction, and the eccentric weight 104 begins to move in a clockwise direction while rotating in an anticlockwise direction. In FIG. 4, if the positions of the support shafts 101 and 103 are designated a and b respectively and the direction which is at right angles to the line connecting the positions a and b is designated c–d, the movement of the drive gear 107 from the position b to the position a will cause the driven gear 105 to move from the position a to the position b, and the gear 105 will make one complete revolution relative to the disc because of the gear tooth ratio 1:2 of driven gear 105 to drive gear 107. If the eccentric weight 104 is mounted on the support shaft 101 such that its gravitational position is disposed outwardly of the shaft 101 in the position a as illustrated and a portion thereof projects outwardly of the peripheral surfaces of the discs, the projecting portion will be gradually hidden behind the disc 100c as the discs rotate and hidden completely behind the discs 100c when the gear 105 is in the position c. After passing by the position c, the portion of the eccentric weight 104 will begin to make its appearance from behind the disc 100c until the projection extends outwardly from behind the discs 100c when the gear 105 is in the position d as when it is in the position a. On the other hand, since the crank arm 108 is inclined in positions other than the positions a and b, the force of inertia etc. exerted by the crank arm 108 on the disc 100c will be equal to a component of force in the direction of inclination of the crank arm with respect to the force acting to move upwardly or downwardly the total weight of the crank arm 108, first vertical operation shaft 49 and the member attached to the shaft 49. Accordingly, the force of inertia etc. exerted on the disc 100c is smaller in other positions than the positions a and b, and consequently the operation can be performed with a relatively small force, with the force of inertia etc. being minimized in the positions c and d and the operation being performed with a minimum force.

On the other hand, the eccentric weight 104 behaves as aforementioned, so that the centrifugal force exerted by the eccentric weight on the disc 100c is maximized in the positions *a* and *b* and minimized in the positions *c* and *d*. Thus, the force of inertia etc. exerted by the crank arm 108 is offset by the centrifugal force exerted by the eccentric weight, so that balance can be maintained and the vibration of the crank can effectively be prevented. This permits to smoothly move the first vertical operation shaft 49 up and down in vibratory motion.

Figures 5, 6:
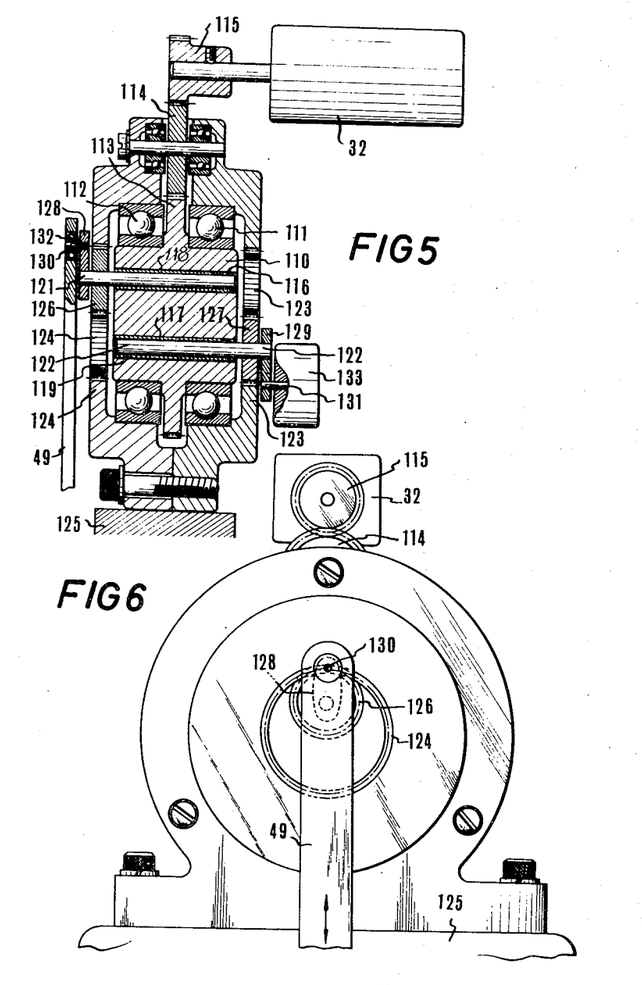
FIG. 5 is a sectional view of a third embodiment of the cutter up-and-down moving mechanism of the cutting device.
FIG. 6 is a side view of FIG. 5.

FIGS. 5 and 6 show a third embodiment of the cutter up-and-down moving mechanism of the cutting device 30. 110 refers to a rotary member journalled by bearings 111 and 112 and including a gear 113 mounted in its central portion and maintained in meshing engagement with an intermediate gear 114 which meshes with a drive gear 115 mounted on the drive shaft of the motor 32, so that the gear 113 is driven by the gear 115. Formed symmetrically in the rotary member 110 are eccentric bores 116 and 117 which rotatably receive therein crank shafts 121 and 122 through bushes 118 and 119 respectively. 123 and 124 refer to internally toothed gears disposed symmetrically on opposite sides of the rotary member 110 and secured to a machine frame 125 secured to the support member 33. 126 and 127 refer to pinions maintained in meshing engagement with the internally toothed gears 124 and 123 respectively and fixedly supported by the crank shafts 121 and 122 respectively. 128 and 129 refer to cranks secured to one end of the crank shafts 121 and 122 respectively and disposed as symmetrical points.

130 and 131 refer to pins secured to the cranks 128 and 129 respectively, one pin 130 rotatably supporting one end of the first vertical operation shaft 49 through a bearing 132 and the other pin 131 having a balance weight 133 secured thereto. The pitch circle of the pinions 126 and 127 has a diameter which is equal to the radius of the pitch circle of the internally toothed gears 124 and 123. The pins 130 and 131 secured to the cranks 128 and 129 are arranged such that they are disposed on the pitch circle of the internally toothed gears 124 and 123 respectively when the pinions 126 and 127 are disposed in the uppermost end and lowermost end. This mechanism is a so called linear movement mechanism utilizing a Cardan circle.

If the motor 32 secured to the support member 33 is operated to cause the rotary member 110 to rotate, the pinions 126 and 127 will rotate while maintained in engagement with the internally toothed gears 124 and 123 and the pins 130 and 131 will move in linear up-and-down motion in the diametrical direction of the internally toothed gears 124 and 123 in accordance with the principles of the linear movement mechanism utilizing a Cardan circle. Thus, the first vertical operation shaft 49 and balance weight 133 move up and down in elevational motion.

In this case, the first vertical operation shaft 49 and balance weight 133 alternately move up and down in a symmetrical manner, so that they move while being maintained in a balanced state. This is effective to cause the first vertical operation shaft 49 to move smoothly up and down in vibratory motion without shaking transversely.

Figure 7:
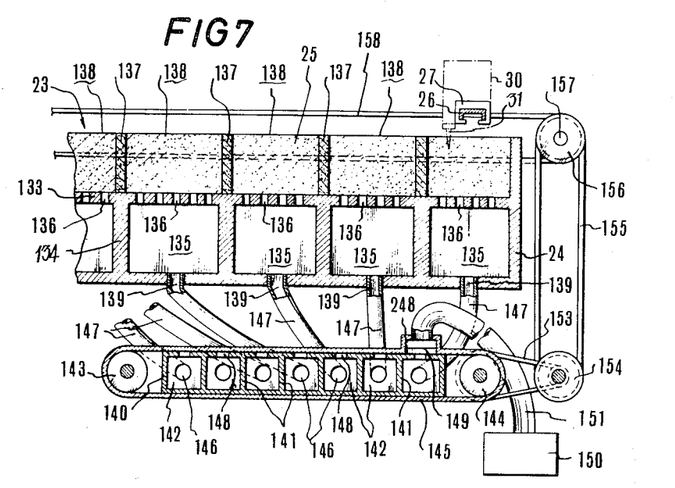
FIG. 7 is a sectional view, with details thereof being omitted, of a mechanism for producing a suction force for holding a cloth in place on the upper surface of the cutting table.

FIG. 7 is a sectional view in explanation of the device for producing a suction force for holding a cloth in place on the upper surface of the cutting table 23. The cutting table 23 formed of a spongy material is removably disposed on a rest plate 133 formed in the box 24. A plurality of partition plates 134 are mounted in the portion of the box 24 which is disposed below the rest plate 133, such partition plates 134 being arranged parallel to the movable bar 26 and spaced apart equidistantly from one another so as to divide the portion of the box 24 below the rest plate 133 into a plurality of chambers 135. A multitude of air passing openings 136 are formed in the rest plate 133 for maintaining communication between the chambers 135 and the upper portion of the box 24.

Soft plate-like members 137 made of an air nonpermeable material, such as foamed polyethylene, are embedded in the spongy material 25 disposed on the rest plate 133 in such a manner that each soft plate-like member 137 is arranged on the extension of one of the partition plates 134. A plurality of suction chambers 138 are formed in the box 24, each suction chamber being defined by the air nonpermeable platelike members 137, partition plates 134, side walls of the box 24, and top and bottom walls of the box 24.

Openings 139 are formed in the bottom wall of the box 24 one for each suction chamber 138. 140 is an elongated casing which is divided by a plurality of partition plates 141 into small chambers 142 which are equal in number to the suction chambers 138.

Belt pulleys 143 and 144 are rotatably mounted on opposite ends of the casing 140, and an endless belt 145 is movably trained between the belt pulleys 143 and 144 in such a manner that the endless belt 145 is maintained in contact with the upper surface of the casing 140. A plurality of openings 146 are formed in one side wall of the casing 140 one for each small chamber 142, and each of the openings 139 and each of the openings 146 are connected by a line 147 so as to maintain communication between each suction chamber 138 and each small chamber 142 corresponding in position to each other.

148 refers to openings formed in the top wall of the casing 140 one for each small chamber 142 and closed by the underside of the belt 145. 248 refers to a movable suction port covering secured to the belt 145. A port 149 is formed in the belt 145 in a position which it is enclosed by the suction port covering 248. Thus, if the port 149 formed in the belt 145 is indexed with one of the openings 148 during the movement of the belt 145, then the movable suction port covering 248 is brought into communication with the small chamber 142 whose opening 148 is indexed with the port 149. The movable suction port covering 248 maintains communication with a vacuum source 150 through a line 151. As the belt 145 moves, the movable suction port covering 248 and port 149 move along the top wall of the casing 140.

A belt 153 is trained about a pulley (not shown) mounted coaxially with the belt pulley 144 and a pulley 154. A belt 155 is trained about the pulley 154 and a pulley 156 mounted on a shaft 157 which also mounts thereon a pulley (not shown) for supporting a belt 158 for moving the movable bar 26 in the X axis direction.

The shaft 157 is connected to the output shaft of the pulse motor or servo motor MX and driven thereby. Upon application of a pulse signal to the pulse motor or servo motor MX when cutting is effected, the belt 158 is driven and moves the cutting device 30 in the X direction on the cutting table 23. As the movable bar 26 moves, the belt 145 is moved through the belts 155 and 153 and the suction port covering 248 moves with the belt 145. When the suction port 149 is brought into index with one of the openings 148, the vacuum device 150 is connected to the suction chamber 138 which is connected to the particular opening 148 through its opening 139 and line 147, so that a suction force is produced in the particular suction chamber 138. The suction port covering 248 is moved in association with the movable bar 26 such that the vacuum device 150 is connected to the suction chamber 138 in which the forward end of the cutter 31 of the suction device 30 is disposed.

The shape and size of the suction port cover 248 and the position of each of the openings 148 are set such that, when the forward end of the cutter 31 is positioned on or near the boundary 137 between the two adjacent suction chambers 138, the suction port covering 248 is indexed with the two openings 148 of the two adjacent suction chambers 138, so that a suction force is produced in the two suction chambers.

The arrangement that a suction force is produced only in the suction chamber or chambers 138 in which the cutter 31 is positioned permits the use of a vacuum device 150 of smaller capacity than would be used when creating a suction force great enough to hold the cloth in place over the entire area of the cutting table 23. It is to be understood that a vacuum device of large capacity may be used to produce a suction force over the entire area of the upper surface of the cutting table 23 for holding the cloth in place over the entire area of the cutting table.

Figure 8:
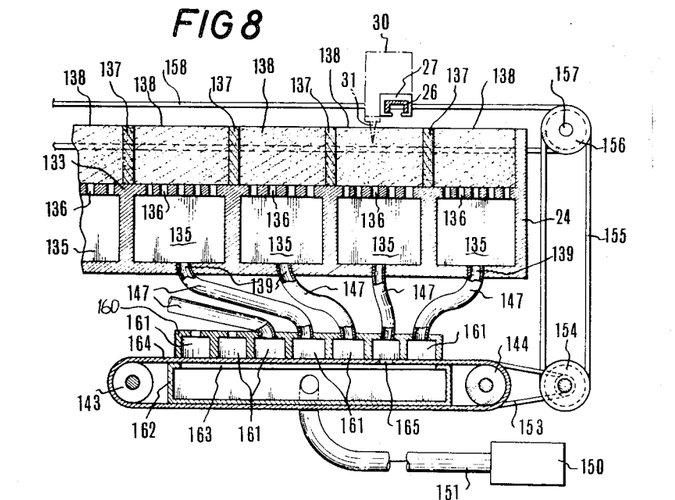
FIG. 8 is a sectional view, with details thereof being omitted, of a second embodiment of the mechanism for producing a suction force for holding a cloth in place on the upper surface of the cutting table.

FIG. 8 shows a second embodiment of the mechanism for producing a suction force to hold the cloth in place on the upper surface of the cutting table 23. A dispensing box 160 is divided into a plurality of small chambers 161 each of which is connected through a line 147 to one of the suction chambers 138 corresponding to each other in position. The dispensing box 160 is secured to the top wall of a casing 162 and a slot 163 extends through substantially the entire length of the casing 162. Each small chamber 161 maintains communication with the interior of the casing 162 through the slot 163. An endless belt 164 arranged in the same manner as the embodiment shown in FIG. 7 is movably mounted between the dispensing box 160 and casing 162 which are superposed one over the other. The dispensing box 160 is disconnected from the casing 162 by the belt 164, but the belt 164 is formed with an opening 165 so that the small chamber 161 which is indexed with the opening 165 is connected to the interior of the casing 162 through the opening 165. The vacuum device 150 is connected to the casing 162 by a line 151.

The belt 164 moves as the movable bar 26 moves in the Y direction, so that the suction chamber 138 in which the cutter 31 is positioned is connected to the vacuum device 150 through the opening 165 formed in the belt 164. By suitably setting the size of the opening 165, it is possible to connect the vacuum device 150 to two adjacent suction ports 138 when the cutter 31 is positioned on or near the boundary between the two suction ports 138. Other constructions of the present embodiment is similar to those of the embodiment shown in FIG. 7 and their description is omitted.

Figure 9:
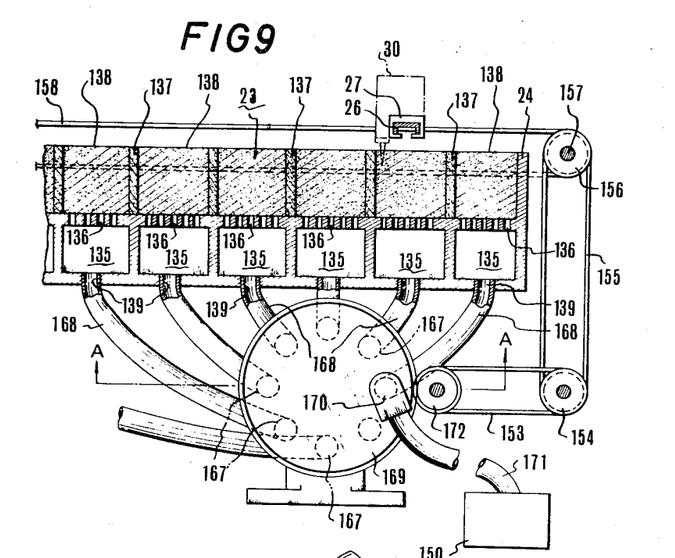
FIG. 9 is a sectional view, with details thereof being omitted, of a third embodiment of the mechanism for producing a suction force for holding a cloth in place on the upper surface of the cutting table.
Figure 10:
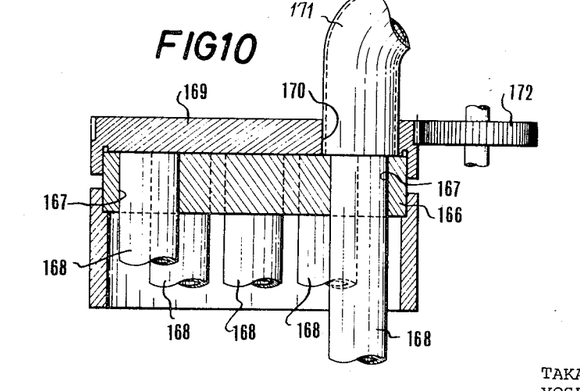
FIG. 10 is a sectional view taken along the line A—A of FIG. 9.

FIGS. 9 and 10 show a third embodiment of the mechanism for producing a suction force for holding the cloth in place on the upper surface of the cutting table 23. 166 refers to a piping table which is formed with openings 167 equal in number to the suction chambers 138 and disposed substantially equidistantly from one another on a circle. Each opening 167 is connected through a line 168 to one of the suction chambers 138 corresponding in position. 169 refers to a rotary disc which is rotatably mounted on the piping table 166 and maintained in intimate contact therewith. The rotary disc 169 is formed with a suction port 170 which is connected to the vacuum device 150 through a line 171. The suction port 170 is disposed on the circle formed by the openings 167 and adapted to index with one of the openings 167 so that a suction force is transmitted from the vacuum device 150 to the suction chamber 138 which communicates with the opening 167 indexed with the suction port 170.

The rotary disc 169 is formed on its outer circumferential surface with a serration which is maintained in meshing engagement with a gear 172 adapted to rotate in conjunction with the movement of the movable bar 26 caused by the pulse motor MX to move in the X axis direction.

As the rotary disc 170 rotates, the suction port 170 moves on the circle formed by the openings 167 and brought into index with one opening 167 after another. The movement of the suction port 170 is controlled by the rotation of the pulse motor MX. As the movable bar 26 moves in the X axis direction and the cutter 31 is positioned on one of the suction chambers 138, the suction port 170 is brought into index with the opening 167 which is connected to the particular suction chamber 138 in which a suction force is produced. The rate of rotation of the rotary disc 169 and the shape of the suction port 170 and openings 167 are designed such that, when the cutter 31 is positioned on or near the boundary 137 between the two adjacent suction chambers 138, the suction port 170 is indexed with the two openings 167 connected to the two adjacent suction chambers 138.

Figure 11:
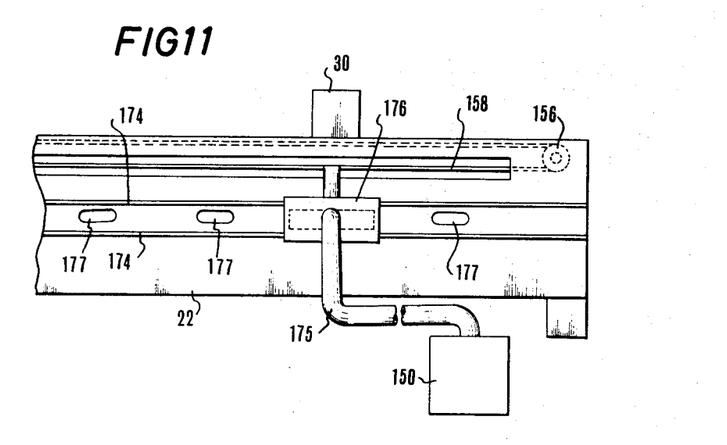
FIG. 11 is a side view of a fourth embodiment of the mechanism for producing a suction force for holding a cloth in place on the upper surface of the cutting table.

FIG. 11 shows a fourth embodiment of the mechanism for producing a suction force for holding the cloth in place on the upper surface of the cutting table 23. Rails 174 are provided on one side of the machine body 22 of the automatic cutting machine for movably mounting thereon a suction port 176 which is secured to the movable bar driving belt 158 or the movable bar 26. The suction port covering 176 is connected to the vacuum device 175 through a line 175. Formed between the rails 174 on the side of the machine body and disposed on a straight line are openings 177 each connected to one of the suction ports 138. The suction port 176 is of such shape and size that it is brought into index with one or two adjacent openings 177. The suction port 176 is adapted to move along the rails 174 in conjunction with the movement of the movable bar 26 so as to come into index with the opening 177 of the suction chamber 138 in which the cutter 31 is positioned for producing a suction force in such suction chamber. If desired, it is possible to produced a suction force in the adjacent two suction chambers.

It is possible to arrange the partition plates 134 and air nonpermeable soft plate-like members 137 in the cutting table 23 at right angles to the movable bar 26 and spaced apart from one another a predetermined distance so as to form a plurality of suction chambers disposed at right angles to the movable bar 26. In this case, the movement of the suction port covering described with reference to the embodiment of the mechanism for producing a suction force shown in FIG. 11 is preferably controlled by the motor MY operating the carriage 27.

Figure 12:
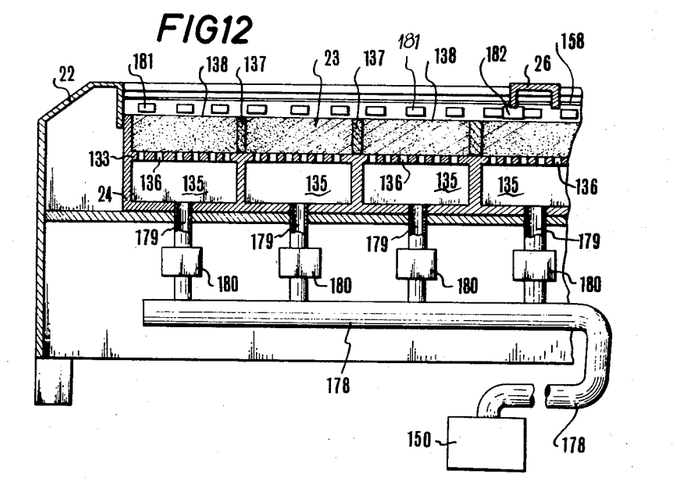
FIG. 12 is a sectional view, with certain parts being cut out, of a fifth embodiment of the mechanism for producing a suction force for holding a cloth in place on the upper surface of the cutting table.
Figure 13:
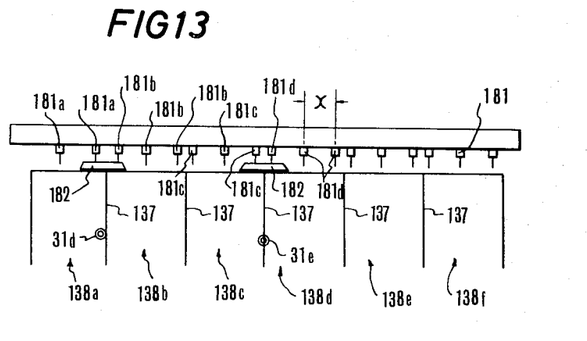
FIG. 13 is a view in explanation of the relative positions of limit switches and a switch actuating member.

FIGS. 12 and 13 show a fifth embodiment of the mechanism for producing a suction force for holding the cloth in place on the upper surface of the cutting table 23.

The suction chambers 138 are each connected through a tube 179 to a line 178 connected to the vacuum device 150, and an electromagnetic valve 180 is mounted in each tube 179. The opening and closing of the electromagnetic valves 180 is controlled by limit switches 181 mounted on the path of travel of the movable bar 26 on the side surface of the machine body 22. A switch actuating member 182 provided at one end of the movable bar 26 is brought into engagement with one of the limit switches 181 as the movable bar 26 moves so as to turn on the limit switch 181 and open the electromagnetic valve 180 associated with the limit switch 181, whereby a suction force can be produced in the suction chamber 138 in which the limit switch 181 is mounted.

The switch actuating member 182 is adapted to actuate only the limit switch 181 for opening the electromagnetic valve 180 of the suction chamber 138 in which the cutter 31 is positioned. Preferably, the shapes and relative positions of the limit switches and switch actuating member are set such that, when the cutter 31 is positioned on or near the boundary between the adjacent two suction chambers, a suction force can be produced in the adjacent two suction chambers between the boundary.

With reference to FIG. 13, three limit switches 181 are mounted in each of the suction chambers 138b to 138f, one in the central portion of each suction chamber and one each on either end of the suction chamber. The three limit switches for each suction chamber 138 are adapted to open and close only the electromagnetic valve 180 mounted in the particular suction chamber 138. Only the suction chamber 138a has two limit switches 181. This is because one end of the suction chamber 138 forms the starting point of the cutter 31. The switch actuating member 182 operatively associated with the cutter 31 may have a length which is slightly greater than the greatest distance X between the two adjacent limit switches 181. The length of the switch actuating member 182 can be reduced by increasing the number of limit switches 181 provided in each suction chamber. On the other hand, it is possible to reduce the number of limit switches 181 by increasing the length of the switch actuating member 182. If the cutter 31 is positioned on one suction chamber 138, then the limit switches 181 associated with the suction chamber 138 are turned on. If the cutter 31 is positioned on or near the boundary 137 between the adjacent two suction chambers 138, then the limit switches 181a and 181b of the two adjacent suction chambers 138 are turned on.

In the embodiment described, it is also possible to arrange the partition plates 134 and air nonpermeable soft plate-like members 137 in the cutting table 23 at right angles to the movable bar 26 and spaced apart from one another a predetermined distance so as to form a plurality of suction chambers 138 disposed at right angles to the movable bar 26. In this case, the limit switches are preferably mounted on the movable bar 26 and adapted to be actuated by the switch actuating member operatively associated with the carriage 27.

While the embodiments of the mechanism for producing a suction force for holding the cloth in place on the upper surface of the cutting table described above use as operation control means the pulse motor or servo motor MX or MY for operating the movable bar 26, it is to be understood that another control motor may be provided to attain the end in place of using the motor MX or MY.

Figure 14:
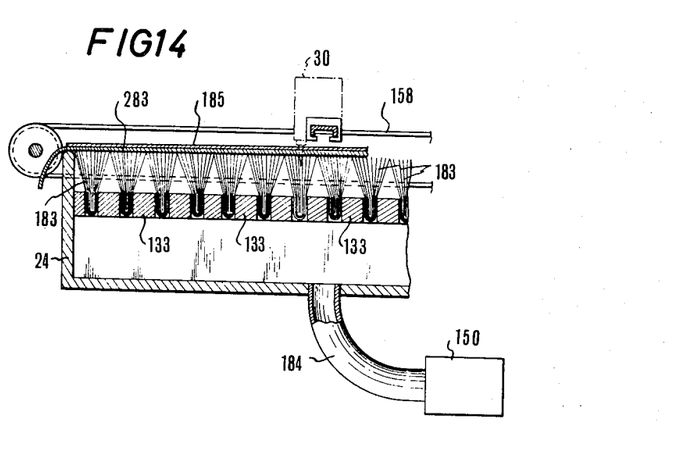
FIG. 14 is a sectional view, with certain parts being omitted, of a sixth embodiment of the mechanism for producing a suction force for holding a cloth in place on the upper surface of the cutting table.
Figure 15:
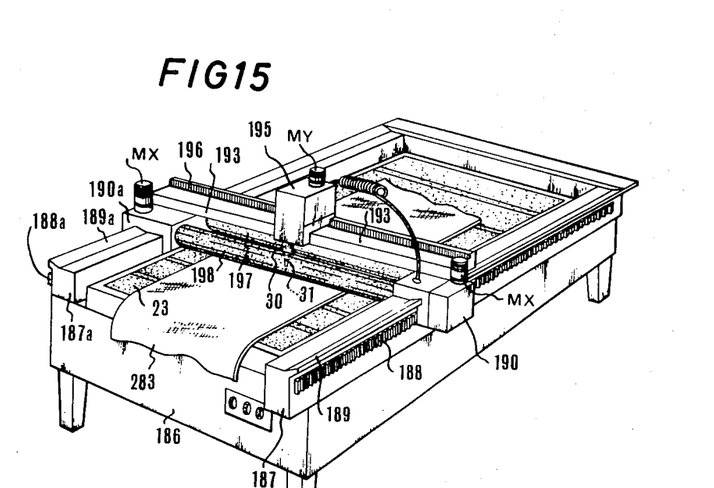
FIG. 15 is a perspective view of another embodiment of the automatic cutting machine provided with means for holding down the cloth on the cutting table by rollers.
Figure 16:
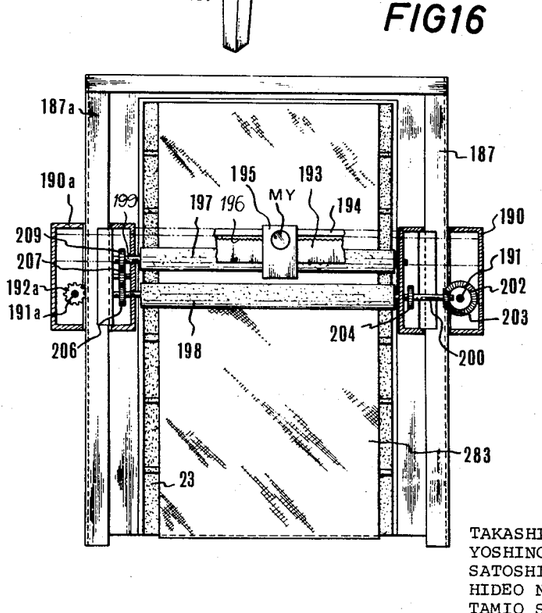
FIG. 16 is a plan view, with certain parts being cut out, of the automatic cutting machine shown in FIG. 15.
Figure 17:
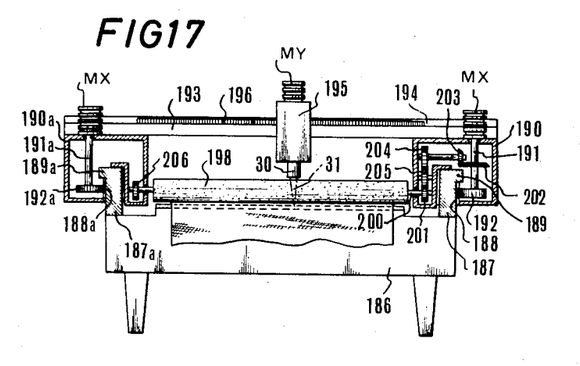
FIG. 17 is a front view, with certain parts being cut out, of the automatic cutting machine shown in FIG. 15.
Figure 18:
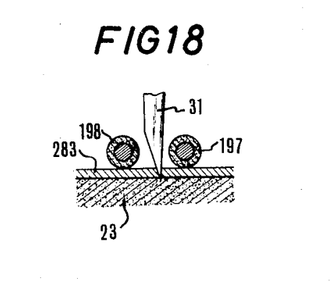
FIG. 18 is a view in explanation of the relative positions of the cloth holding down rollers and cutter of the automatic cutting machine shown in FIG. 15.

FIG. 14 shows a sixth embodiment of the mechanism for producing a suction force for holding the cloth in place on the upper surface of the cutting table. Brush-like fine hair 183 is provided in large number in the rest plate 133 and the upper end of the hair is cut to provide a planar surface for placting a cloth 283 thereon. The hair 183 is so large in number that it will never be bent when the cloth 283 is placed thereon. The forward end of the cutter 31 can freely path through the hair 183. By connecting the box 24 to the vacuum device 150 through a line 184, it is possible to draw and hold the cloth in place on the hair 183 by a suction force. In order to increase the suction force, a sheet material 185 made of paper, vinyl or other sealing material preferably placed on the cloth 183'. The sheet material 185 is effective to substantially seal off the box 24, so that the suction force produced by the vacuum device 150 acts effectively on the sheet material 185 to hold the cloth 283 in place on the upper surface of the cutting table 23. In the embodiment in which the brush-like fine hair 183 is used for making up the cutting table, it is possible to divide the cutting table into a plurality of suction chambers 138.

FIGS. 15 to 18 show another embodiment of the present invention in which the automatic cutting machine is provided with a device for holding down the cloth by means of rollers. 186 refers to a base of the automatic cutting machine on which X coordinate bars 187 and 187a are disposed in parallel relation. Rack gears 188 and 189a are provided and disposed longitudinally on one side of the X coordinate bars 187 and 187a respectively. Rails 189 and 189a are mounted on the upper surface of the X coordinate bars 187 and 187a respectively, and transverse feed carsors 190 and 190a are slidably mounted on the rails 189 and 189a respectively. Pulse motors MX and MX' mounted on the carsors 190 and 190a respectively have output shafts 190 and 190a which are maintained in meshing engagement with the rack gears 188 and 188a through pinions 192 and 192a respectively. Mounted on the carsors 190 and 190a and disposed at right angles to the X coordinate bars 187 and 187a is a Y coordinate bar 193 which is adapted to move in sliding motion on the rails 189 and 189a as pulses are supplied to the pulse motors MX and MX'. Mounted on the Y coordinate bar 193 is a rail 194 on which a longitudinal feed carsor 195 is slidably mounted. The carsor 195 is adapted to move in sliding motion as pulses are supplied to a pulse motor MY mounted on the carsor 195.

The pulse motor MY has an output shaft which is maintained, through a pinion, in meshing engagement with a rack 196 mounted on one side of the rail 194. The cutting device 30 is provided on the longitudinal feed carsor 193. Rollers 197 and 198 spaced apart a suitable distance from each other are rotatably provided on opposite sides of the cutter 31 of the cutting device and either maintained in contact with or spaced apart from the upper surface of the cutting table 23. Shafts 199 and 200 supporting the rollers 197 and 198 respectively are rotatable mounted between the transverse feed carsors 190 and 190a, so that the rollers 197 and 198 are maintained parallel to the Y coordinate bar 193. Secured to one end of the shaft 200 is a gear 201 to which the rotation of the pulse motor MX is transmitted through a gearing comprising a drive bevel gear 202 secured to the output shaft 191 of the pulse motor MX, a driven bevel gear 203 meshed with the gear 202, a gear 204 coaxial with the gear 203, and a pinion 205 meshed with the gear 204. The rate of rotation of the gear 201 is set such that the peripheral velocity of the roller 198 is equal to the rate of movement of the Y coordinate bar 193. Mounted on the other end of the shaft 200 is a gear 206 which is maintained, through an intermediate gear 207, in meshing engagement with gear 209 mounted on one end of a shaft 199 supporting the roller 197. The direction and rate of rotation of the roller 197 are set such that they are equal to those of the roller 198. On the other hand, the rollers 197 and 198 are adapted to rotate at the same peripheral velocity as the rate of movement of the Y coordinate bar while holding down the cloth 283 perpendicularly on to the surface of the cutting table 23 and to rotate in the same direction as the direction of movement of the Y coordinate bar 193. Thus, the rollers 197 and 198 are effective to press and hold down the opposite sides of a portion of the cloth 283 on which the cutter 31 is positioned at all times. The rollers 197 and 198 may be mounted on the transverse feed carsors 190 and 190a respectively for free rotation in place of being connected to a drive mechanism. Combined with the action of the mechanism for holding the cloth in place on the upper surface of the cutting table, the action of the rollers 197 and 198 to hold down the cloth permits to effectively hold the cloth positively in place on the upper surface of the cutting table so that the cutting operation can be performed satisfactorily.

Figure 19:
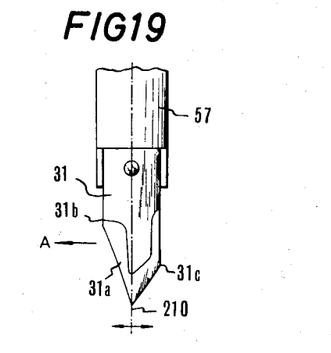
FIG. 19 is a side view of the cutter used with the automatic cutting machines of FIGS. 1 and 15.

FIG. 19 shows an embodiment of the cutter 31 of the cutting device 30. The cutter 31 comprises a blade 31a including a foremost end 31b and a rearmost end 31c. The cutter 31 is attached to the forward end of the second vertical operation shaft 57 such that the foremost end 31b of the blade 31a is disposed forwardly of a center line 210 of rotation of the cutter 31 with respect to the direction A of movement of the cutter and the rearmost end 31c thereof is disposed reafwardly of the center line of rotation of the cutter. With the cutter 31 being constructed in this manner, it is possible, when the cutter 31 is moved upwardly away from the cloth and turned through any angle as desired to change the direction of movement of the cutter while the carriage 27 is rendered inoperative, to cause the loci of the blade 31a to cross each other at the point where the direction of movement of the cutter is changed. This makes it possible to automatically effect continuously cutting without leaving any portion of the cloth uncut.

Figure 20:
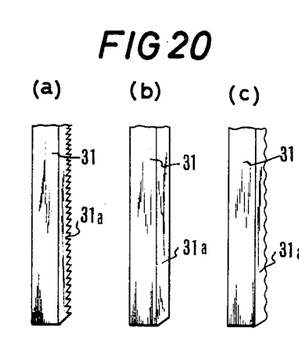
FIGS. 20a, 20b and 20c are side views of other embodiments of the cutter.
Figure 21:
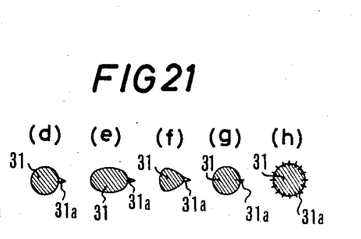
FIGS. 21d, 21e, 21f and 21g are sectional views of other embodiments of the cutter.

FIGS. 20 and 21 show other embodiments of the cutter 31. The embodiment of the cutter 31 shown have a minimized width, so that the blade 31a thereof is also minimized. In order to give sufficiently high strength to the cutter, the cutter may be constructed such that it is circular, rectangular with rounded corners and triangular with rounded corners as shown in FIGS. 21d. 21e and 21f.

The blade 31a may be formed integrally with the cutter 31 as shown in FIGS. 21d, 21e and 21f or separately from the cutter 31 as shown in FIG. 21g.

The embodiments of the cutter described above have a minimized width and their angles are rounded. This arrangement is advantageous when the direction of movement of the cutter 31 is changed through a large angle, because the cutter can be turned with its forward end extending through the cutting table, and it is not required to move the forward end of the cutter away from the upper surface of the cutting table. Thus, automatic cutting can be continued by turning the cutter without moving the same away from the cutting table. If the cutter 31 is provided with a number of blades 31a as the embodiment of FIG. 21h, it is not required to turn the cutter each time the direction of movement of the cutter is changed.

What is claimed is:

1. An automatic cutting machine comprising a cutting table including an open-top rectangular box having a horizontal rest plate intermediate the height thereof; a plurality of air nonpermeable parallel plate members extending transversely in said box above said rest plate to form a plurality of suction chambers; each of said chambers having therein sponge-like material positioned on said rest plate; said rest plate having openings extending therethrough in communication with each of said suction chambers; a plurality of partition plates aligned with said plate members in said box below said rest plate forming a plurality of chambers communicating through said openings with said suction chambers; a carriage positioned above said cutting table for movement parallel to the upper surface thereof in predetermined directions; a cutting device supported by said carriage for movement therewith to cut a cloth supported on said cutting table; a numerical control system operatively connected to said carriage for selectively causing movement thereof in said predetermined directions; suction means connectable with said suction chambers for imparting suction thereto sufficient to hold said cloth in place on said cutting table; and suction control means operatively connected to said numerical control means to be synchronized with said movement of said carriage for selectively connecting said suction means through one of said chambers to the predetermined suction chamber over which said cutting device is positioned, said suction control means comprising a casing separate from said box and having therein a plurality of small chambers corresponding in number to said suction chambers, each of said small chambers being in communication with one of said chambers, and movable means for selectively connecting said suction means to one of said small chambers.

2. A machine as claimed in claim 1, wherein each of said small chambers has an opening therein; and said movable means comprises a belt movable over said casing and having a port selectively alignable with said small chamber openings, and a movable suction port covering connecting said suction means with said port and movable with said belt; said belt being synchronized with said movement of said carriage.

3. A machine as claimed in claim 1, wherein said casing further has a large chamber therein communicating with said suction means and a slot providing communication between said large chamber and said small chambers; and said movable means comprises a belt having a port therein and movable between said large chamber and said small chambers to block said slot, said port selectively connecting said slot and said small chambers, and said belt being synchronized with said movement of said carriage.

4. A machine as claimed in claim 1, wherein said small chambers comprise a plurality of openings oriented in a circle within said casing; and said movable means comprises a rotary disc mounted to rotate on said casing, said rotary disc having therein a suction port connected to said suction means; said rotary disc being synchronized with said movement of said carriage.

* * * * *